(12) United States Patent
Abraham et al.

(10) Patent No.: US 6,220,624 B1
(45) Date of Patent: Apr. 24, 2001

(54) MOUNTING BRACKET FOR SEAT MOUNTED AIR BAG

(75) Inventors: Michelle M. Abraham, Macomb; Andrew M. Haig, Ferndale; Anthony C. Burgi, Rochester, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/501,938

(22) Filed: Feb. 10, 2000

(51) Int. Cl.$^7$ ..................................................... B60R 21/16
(52) U.S. Cl. ..................................... 280/728.2; 280/730.2; 280/732
(58) Field of Search .................. 280/730.2, 728.2, 280/732, 731

(56) References Cited

U.S. PATENT DOCUMENTS

| 5,324,072 | 6/1994 | Olson et al. | |
|---|---|---|---|
| 5,383,682 | * 1/1995 | Nagata et al. | 280/728.2 |
| 5,482,313 | * 1/1996 | Ikeya et al. | 280/728.2 |
| 5,553,887 | 9/1996 | Karlow et al. | 280/730.2 |
| 5,645,295 | 7/1997 | White, Jr. et al. | 280/730.2 |
| 5,700,028 | * 12/1997 | Logan et al. | 280/728.2 |
| 5,730,459 | * 3/1998 | Kanda | 280/731 |
| 5,816,660 | 10/1998 | Johnson, II et al. | 297/452.38 |
| 6,095,549 | * 8/2000 | Adomeit et al. | 280/728.2 |
| 6,120,057 | * 9/2000 | Adomeit et al. | 280/731 |

* cited by examiner

Primary Examiner—Eric Culbreth
Assistant Examiner—L. Lum
(74) Attorney, Agent, or Firm—Tarolli, Sundheim, Covell, Tummino & Szabo L.L.P.

(57) ABSTRACT

An apparatus (10) for helping to protect an occupant of a vehicle (26) having a seat (24) for the occupant and a vehicle side structure (28) comprises an air bag module (22) including an air bag (70) inflatable into a position between the occupant and the vehicle side structure. The apparatus (10) also comprises a bracket (20) for supporting the air bag module (22) on the vehicle seat (24). The bracket (20) comprises a first bracket portion (90) connectable to the seat frame (50), and a second bracket portion (100) for mounting the module (22). The bracket (20) includes a hinge (120) disposed intermediate the first and second bracket portions (90, 100) and interconnecting the first and second bracket portions. The hinge (120) enables the second bracket portion (100) to pivot relative to the first bracket portion (90) during inflation of the air bag (70) to affect the direction in which the air bag deploys from the vehicle seat (24).

15 Claims, 3 Drawing Sheets

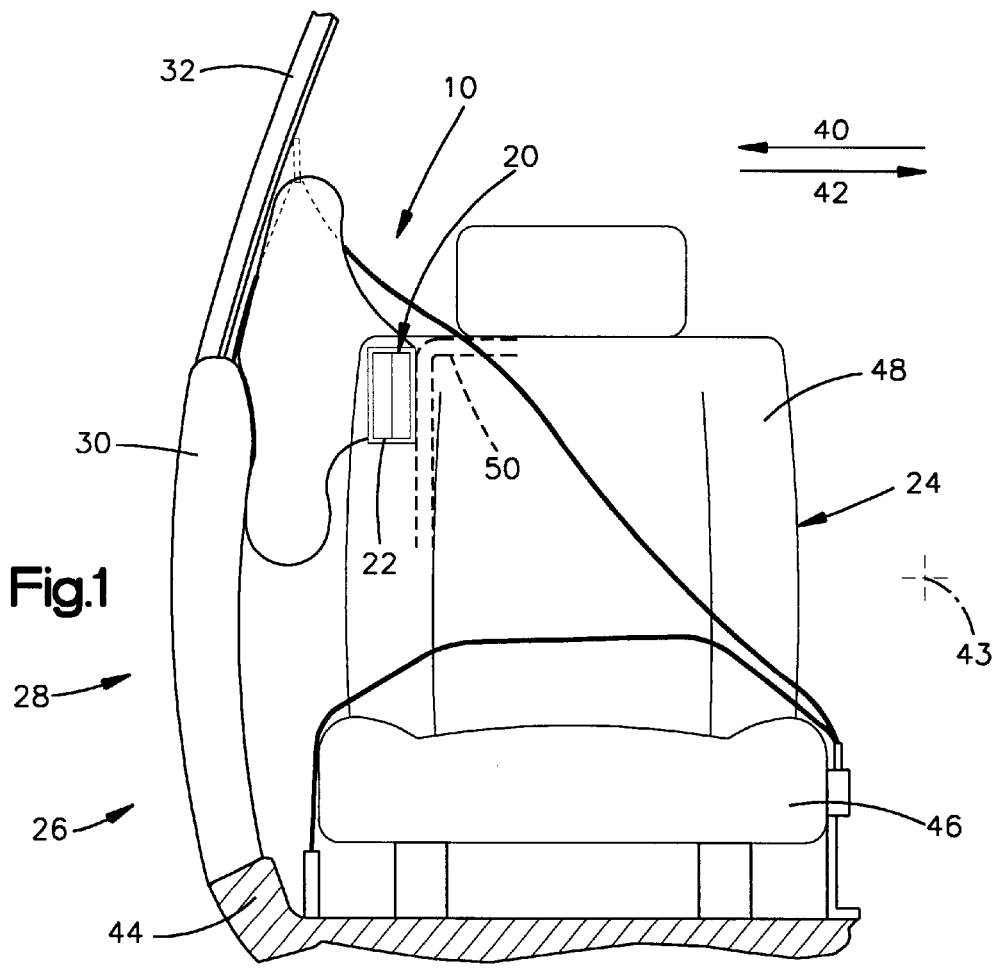
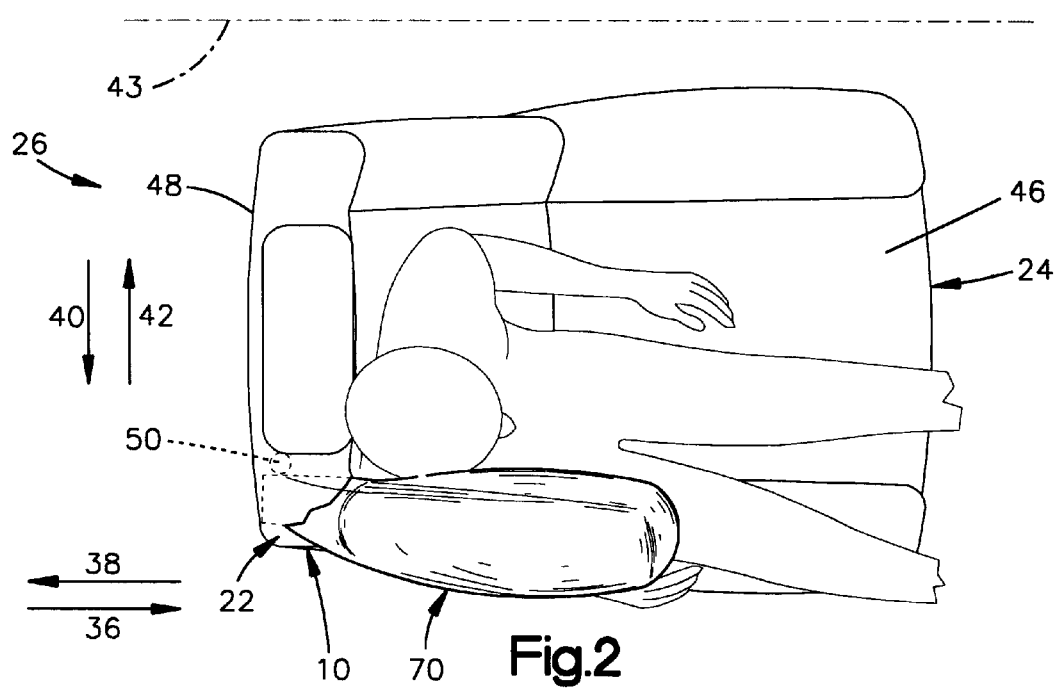

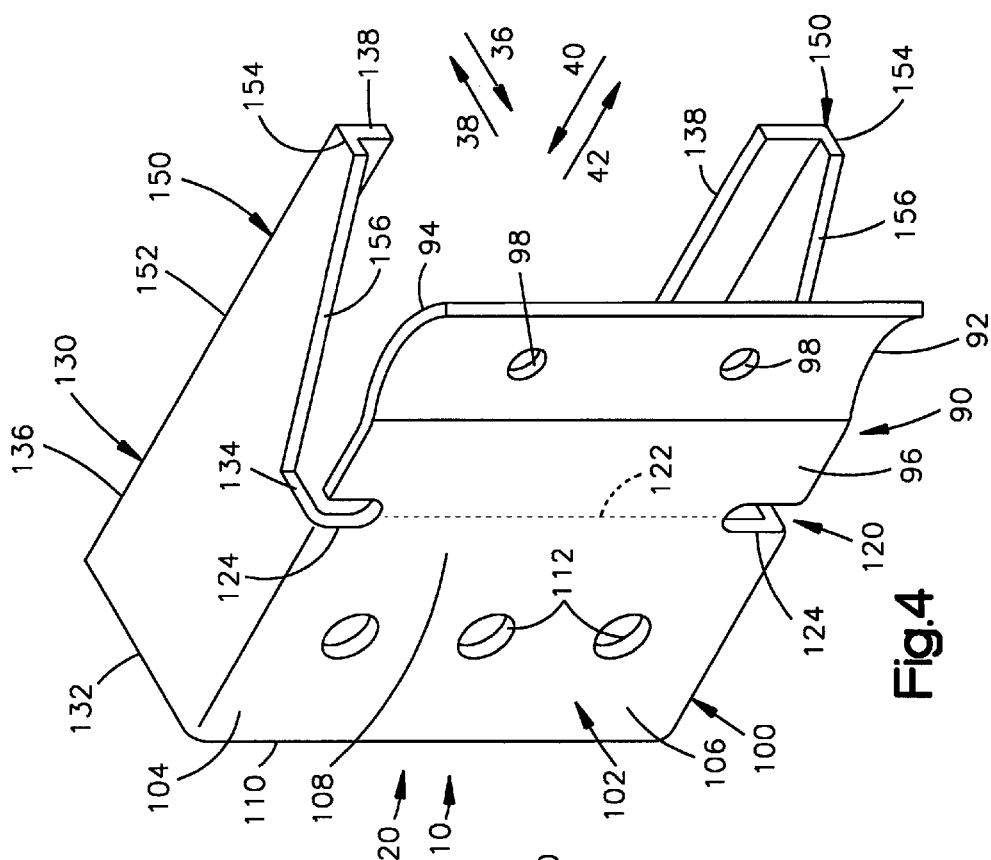
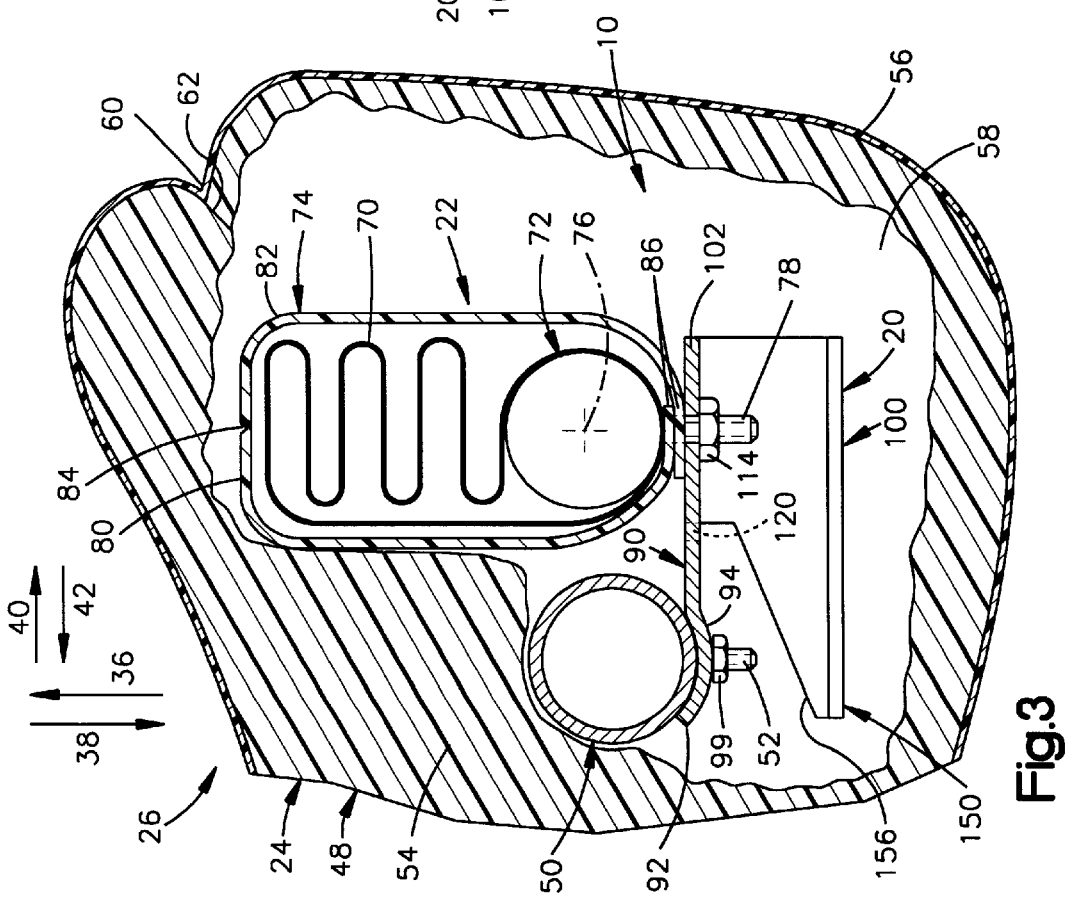

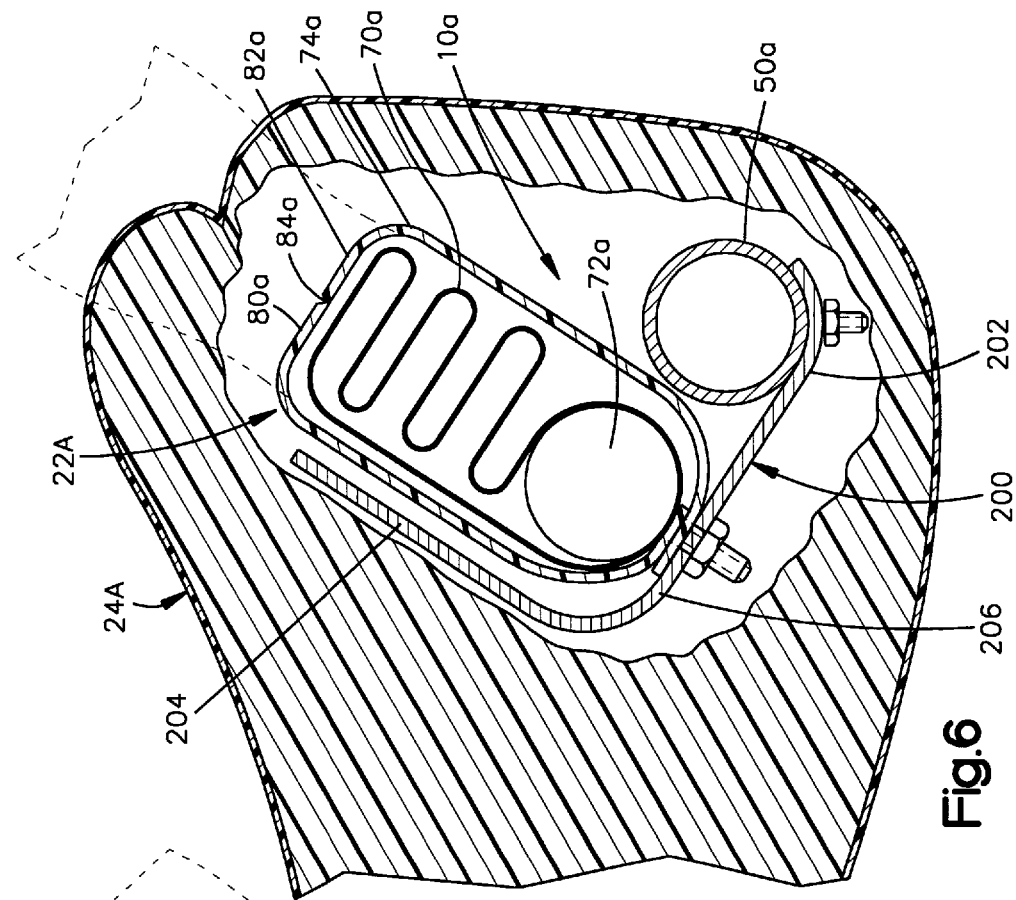
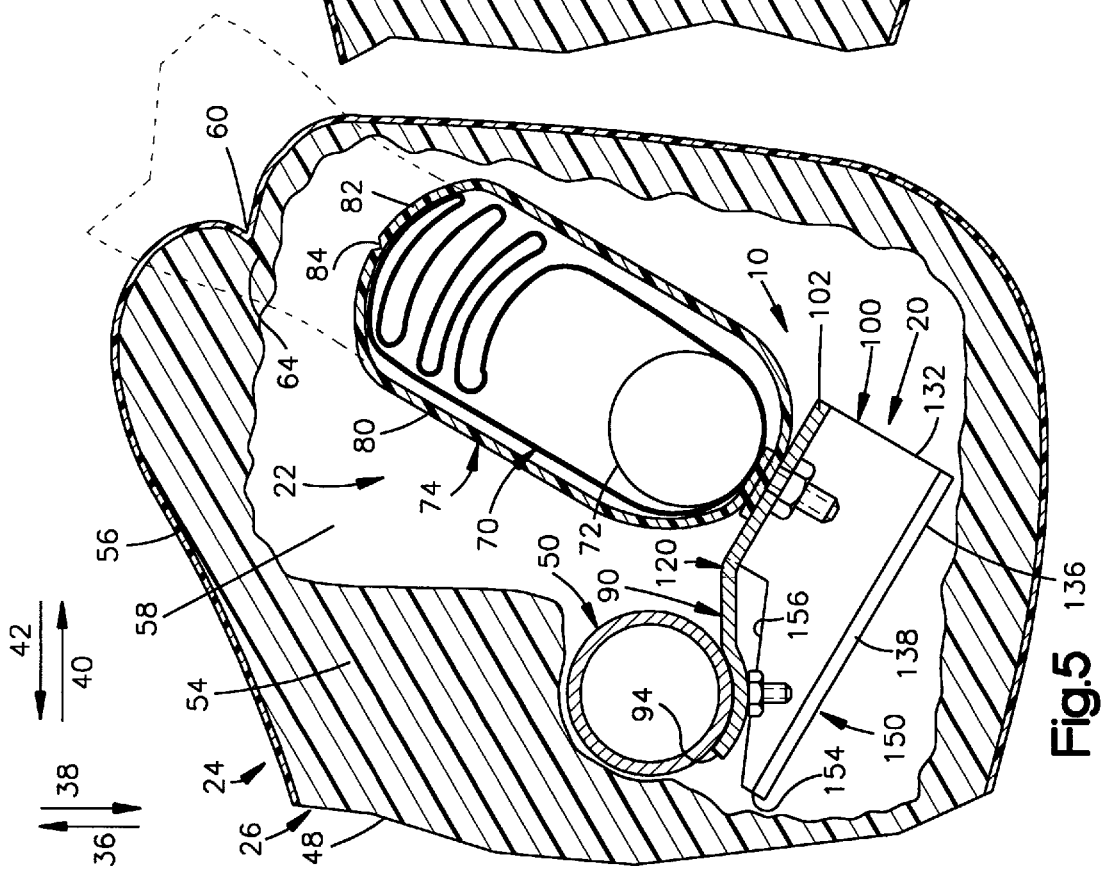

MOUNTING BRACKET FOR SEAT MOUNTED AIR BAG

BACKGROUND OF THE INVENTION

1. Technical Field

The present invention relates to a seat mounted air bag module for helping to protect a vehicle occupant in the event of a side impact to the vehicle. In particular, the present invention is directed to a bracket that mounts an air bag module on a vehicle seat in a manner to modify the direction of deployment of the air bag.

2. Description of the Prior Art

Some vehicles have side impact air bags that can be inflated to help protect an occupant of the vehicle in the event of a side impact to the vehicle or a rollover condition of the vehicle. In some vehicles, the side impact air bag is mounted in a vehicle seat, specifically, in the side bolster of the seatback. The air bag inflates generally forward from the seatback, between the occupant and the side structure of the vehicle, to help protect the vehicle occupant.

The air bag is designed to inflate at an angle relative to a forward direction in the vehicle to provide suitable protection. The position and orientation in which the air bag module is mounted in the seatback determine the direction in which the air bag inflates. Some vehicle seats have limited space in the side bolster of the seatback, which makes it difficult to mount an air bag module there in a manner such that the air bag will inflate in the desired direction.

SUMMARY OF THE INVENTION

The present invention is an apparatus for helping to protect an occupant of a vehicle having a seat for the occupant and a vehicle side structure. The apparatus comprises an air bag module including an air bag inflatable into a position between the occupant and the vehicle side structure. The apparatus also comprises a bracket for supporting the air bag module on the vehicle seat. The bracket comprises a first bracket portion connectable to the seat frame, and a second bracket portion for mounting the module. The bracket includes a hinge disposed intermediate the first and second bracket portions and interconnecting the first and second bracket portions. The hinge enables the second bracket portion to pivot relative to the first bracket portion during inflation of the air bag to affect the direction in which the air bag deploys from the vehicle seat.

BRIEF DESCRIPTION OF THE DRAWINGS

The foregoing and other features of the invention will become more apparent to one skilled in the art upon consideration of the following description of the invention and the accompanying drawings in which:

FIG. 1 is a front elevational view of a portion of a vehicle including a vehicle seat, a portion of the vehicle side structure adjacent the seat, and an air bag module constructed in accordance with a first embodiment of the invention;

FIG. 2 is a top plan view of the vehicle portion of FIG. 1, showing the air bag in an inflated condition;

FIG. 3 is an enlarged sectional view of a portion of the vehicle seat including the air bag module shown in an unactuated condition;

FIG. 4 is a perspective view of a mounting bracket that forms a part of the air bag module;

FIG. 5 is a view similar to FIG. 3, showing the air bag module in an actuated condition; and FIG. 6 is a view similar to FIG. 3 showing a second embodiment of the invention.

DESCRIPTION OF PREFERRED EMBODIMENTS

The present invention relates to a seat mounted air bag module for helping to protect a vehicle occupant in the event of a vehicle collision. In particular, the present invention is directed to a vehicle safety apparatus including a bracket for mounting an air bag module on a vehicle seat to control the direction of deployment of the air bag. As representative of the present invention, FIGS. 1–5 illustrate a vehicle safety apparatus 10 including a bracket 20 for mounting an air bag module 22 to a front passenger seat 24 of a vehicle 26.

The vehicle 26 (FIG. 1) includes a side structure indicated generally at 28. The side structure 28 includes a door 30 disposed adjacent to the seat 24. The door 30 includes a window 32. It should be understood that the present invention is usable in a vehicle such as a van which has no side window adjacent to the seat 24 to help protect the vehicle occupant from contact with the side structure of the vehicle. Also, the present invention is applicable to seats in a vehicle other than a front passenger seat.

A forward direction in the vehicle 26 is indicated by the arrow 36 (FIG. 2) and a rearward direction in the vehicle is indicated by the arrow 38. The arrow 40 indicates an outboard direction in the vehicle 26 (FIG. 1), and the arrow 42 indicates an inboard direction in the vehicle, that is, a direction toward the vehicle centerline or front-to-back axis 43.

The seat 24 is mounted on the vehicle floor 44. The seat 24 includes a seat bottom cushion 46 and a seatback 48 connected with the seat bottom cushion. The seat 24 has a seat frame member 50 (FIGS. 1 and 3). The seat frame member 50 is a substantially rigid structural portion of the vehicle seat. In the illustrated embodiment, the seat frame member 50 has a tubular, cylindrical configuration extending along the top to bottom extent of the seatback 48. A plurality of bracket mounting studs 52 (FIG. 3) are fixed to the seat frame member 50 and extend rearward from the seat frame member.

The seatback 48 also includes a body of foam material 54 covered by a seat covering material 56. The body of foam material 54 forms a side bolster of the seatback 48. A cavity 58 is formed in the foam material 54. The seat frame member 50 extends through the cavity 58.

A tear seam or weakened area 60 is formed in the seat covering material 56. An opening line or weakened area 62 is formed in the foam material 54 and extends inward from the seat covering material 56 to the cavity 58.

The air bag module 22 is preferably of the type described in U.S. Pat. No. 5,645,295. The air bag module 22 includes an air bag 70, an inflator 72 (FIG. 3) for providing inflation fluid to the air bag, and a cover 74 for covering the air bag and inflator. The inflator 72 has an elongate cylindrical configuration centered on an axis 76. The inflator 72 extends generally parallel to the seat frame member 50. A plurality of module mounting studs 78, one of which is shown in FIG. 3, extend from the inflator 72.

The cover 74 is made from a resilient plastic material and has a clamshell configuration including first and second cover portions 80 and 82 joined by a rupturable hinge 84. The first and second cover portions 80 and 82 have outer end portions 86 that overlie each other so that the cover portions are closed in over the inflator 72 and the air bag 70. The mounting studs 78 on the inflator 72 extend through fastener openings in the outer end portions 86 of the cover 74.

The mounting bracket 20 as shown is stamped in one piece from sheet metal, such as aluminum or steel, and is formed into the illustrated configuration. The bracket 20 can be made of a plurality of pieces which are welded or otherwise fastened together to function similar to the illustrated bracket 20. The bracket 20 includes a first portion or seat mounting portion 90 for mounting the bracket to the seat frame member 50. A second or module mounting portion 100 of the bracket 20 mounts the air bag module 22 on the bracket.

The seat mounting portion 90 of the bracket 20 has an arcuate section 92 that is configured to wrap around the arcuate outer surface of the seat frame member 50. The radially outer surface of the arcuate section 92 acts as a stop surface 94, in a manner described below. The seat mounting portion 90 of the bracket 20 also has a planar section 96 that extends outboard from the arcuate section 92 and the seat frame 50.

A plurality of fastener openings 98 are formed in the arcuate section 92 of the bracket 20. The fastener openings 98 receive the bracket mounting studs 52 on the seat frame member 50. Nuts 99 are screwed onto the bracket mounting studs 52 to secure the bracket 20 to the seat frame member 50.

The module mounting portion 100 of the bracket 20 includes a planar base plate 102. The base plate 102 extends vertically along and parallel to the seat frame member 50 and has an upper end portion 104 and a lower end portion 106. The base plate 102 also has inboard and outboard side portions 108 and 110.

The base plate 102 of the module mounting portion 100 of the bracket 20 is coplanar with and extends outboard from the planar section 96 of the seat mounting portion 90 of the bracket. A plurality of fastener openings 112 are formed in the base plate 102. The mounting studs 78 on the inflator 72 extend through the fastener openings 112 in the base plate 102 of the bracket 20. Nuts 114 are screwed onto the mounting studs 78 to secure the inflator 72, and thereby the module 22, to the base plate 102 of the bracket 20.

The seat 24 faces forward in the vehicle 26, in a direction parallel to the centerline of the vehicle. When the air bag module 22 is secured to the seat frame member 50 by the bracket 20, the rupturable hinge 84 of the air bag cover 74 also faces generally forward in the vehicle 26. The base plate 102 extends generally perpendicular to the centerline of the vehicle.

The bracket 20 has a predetermined weakened portion, or bendable portion 120, disposed intermediate the base plate module mounting portion 100 and the seat mounting portion 90 of the bracket. The material of the bracket 20 as shown is weakened along a line 122 extending parallel to the inflator axis 76 at a location between the base plate 102 and the seat mounting portion 90. In the illustrated embodiment, this weakening is accomplished by providing slots 124 at both ends of the line of weakening 122. Alternative methods of weakening the bracket 20 include grooving one or both surfaces of the bracket, and providing dimples or recessed portions in the bracket to make it thinner along the line of weakening. In other designs, the material of the bracket may not be weakened and the bendable portion 120 bends because of its material properties or method of connection to other bracket portions.

The predetermined weakened portion 120 of the bracket 20 enables it to bend. The module mounting portion 100 of the bracket, upon the application of sufficient force, can pivot relative to the seat mounting portion 90 of the bracket, in a manner described below. Thus, the line of weakening 122 forms a pivot point on the bracket.

The module mounting portion 120 of the bracket 20 includes, in addition to the base plate 102, a pair of rectangular rear flanges 130 and an associated pair of triangular stop arms 150. The rear flanges 130 extend rearward from the upper end portion 104 and the lower end portion 106 of the base plate 102. The triangular stop arms 150 extend in the inboard direction from the rear flanges 130.

Each of the rear flanges 130 is bent at ninety degrees from the plane of the base plate 102. Opposite its juncture with the base plate 102, each rear flange 130 has a back edge 136. On its outboard side, each rear flange 130 has an outboard edge 132. The associated stop arm 150 extends from the inboard side of the rear flange 130.

Each of the stop arms 150 has a long back edge 152 that is an extension of the back edge 136 of its associated rear flange 130. The back edges 150 of the stop arms 150 extend inboard to a point about even with the inner end of the arcuate section 92 of the seat mounting portion 90 of the bracket 20. A strengthening lip 138 extends from the back edge 136 of each rear flange 130 and each stop arm 150. Each strengthening lip 138 extends toward the other lip. The base plate 102, the flanges 130, and the lips 138 together have a generally box-shaped configuration. The box-shaped configuration of the module mounting portion 100 of the bracket 20 helps to provide a rigid support for the stop arms 150.

Each stop arm 150 has a short inboard edge 154 that extends forward from its back edge 152 in a direction parallel to the outboard edge 132 of its associated rear flange 130. The inboard edges 154 of the stop arms 150 are shorter than the outboard edges 132 of the rear flanges 130.

Each stop arm 150 also has a stop edge 156 that extends forward and outboard from its inner edge 154 and terminates at its associated rear flange 130. The stop edges 156 extend at an angle to the inner edges 154 and thus give the stop arms their generally triangular configuration. In the illustrated embodiment, the stop edges 156 extend at an angle of about forty-five degrees to the inner edges 154.

The stop edges 156 are spaced apart from the arcuate section 92 of the seat mounting portion 90 of the bracket 20. The distance between the stop edges 156 and the arcuate section 92 of the seat mounting portion 90 of the bracket 20 varies, depending on where the measurement is taken along the length of the stop edge. The stop edges 156 are also spaced apart from the planar section 96 of the seat mounting portion 90 of the racket 20. The spacing is achieved by having the outboard ends of the stop edges 156 meet the associated rear flanges 130 at points that are spaced rearward of the planar section 96. This results in a short inboard edge 134 of each rear flange 130 extending from the associated stop edge 156 to the base plate 102.

The vehicle 26 includes known means (not shown) for sensing a side impact to the vehicle and for actuating the inflator 72 in response to the sensing of a side impact. The means may include a side impact sensor and vehicle circuitry for electrically actuating the inflator 72 in response to sensing a side impact to the vehicle greater than a predetermined threshold value. The means is electrically connected with the inflator 72 for providing an actuation signal to the inflator.

In the event of a side impact to the vehicle 26 of a magnitude greater than the predetermined threshold value, the inflator 72 is actuated. Inflation fluid flows in a forward direction from the inflator 72 into the air bag 70. The rapidly flowing inflation fluid causes the folded air bag 70 to begin to inflate within the closed cover 74.

The inflating air bag 70 presses forward against the inside of the cover 74. As this occurs, a reaction force is generated. The reaction force is directed oppositely from the direction of flow of the inflation fluid and the direction of inflation of the air bag 70, that is, in a generally rearward direction 38. This reaction force is applied through the body of the inflator 72 and through the outer end portions 86 of the cover 74, and acts on the base plate 102 of the bracket 20.

This reaction force is present in a relatively large degree so long as the cover 74 is not yet opened by the inflating air bag 70. The amount of force required to bend the bracket 20 at the predetermined weakened portion 120 is less than the amount of force required for the inflating air bag 70 to open the cover 74. As a result, the bracket 20 bends in response to the applied reaction force, before the inflating air bag 70 opens the cover 74. The bracket 20 bends at the predetermined weakened portion 120. The base plate 102, and the entire module mounting portion 100 of the bracket 20, pivot relative to the arcuate section 92 of the seat mounting portion 90 of the bracket.

When the module mounting portion 100 of the bracket 20 pivots relative to the seat mounting portion 90 of the bracket, the stop arms 150 move toward the seat mounting portion 90 of the bracket. The stop edges 156 on the stop arms 150 engage the stop surface 94 on the arcuate section 92 of the seat mounting portion 90. This engagement stops the pivoting movement of the module mounting portion 100 of the bracket 20 relative to the seat mounting portion 90 of the bracket. The bracket 20 is then in the condition shown in FIG. 5. This pivoting movement occurs and is completed within a few milliseconds, at a time when the air bag 70 is only partially inflated.

As more inflation fluid is directed into the air bag 70, the air bag inflates sufficiently to cause the cover 74 to open at the rupturable hinge 84. The interconnected outer edge portions 86 of the cover 74 act as a second hinge about which the first and second cover parts 80 and 82 move away from each other into an open condition. The cover 74 opens sufficiently that the air bag 70 inflates between the spaced apart cover parts 80 and 82. The inflating air bag 70 pushes through the foam material 54 of the seat 24 and opens the tear seam 60 in the seatback 48. The air bag 70 inflates into a position, as shown schematically in FIG. 1, to help protect the vehicle occupant.

The direction of deployment or inflation of the air bag 70 is a function of the pivoting movement of the module mounting portion 100 of the bracket 20. Specifically, as the bracket 20 bends about its predetermined weakened portion 120, the base plate 102 pivots outboard through an arc of about thirty degrees relative to the front-to-back axis 43 of the vehicle 24. The amount of pivoting can vary and be more or less than 30 degrees. This relatively large amount of pivoting movement enables the air bag 70 to inflate in a more outboard direction in the vehicle 24, that is, closer to the vehicle side structure 28. This change in direction of the inflating air bag 70 can help to position the air bag to provide increased protection to the occupant of the seat.

The angle through which the base plate 102 can pivot is dependent on various factors. One factor is the initial mounting angle of the base plate 102 relative to the centerline 43 of the vehicle 24. When the module 22 is mounted in the seat 54, the base plate 102 extends at a particular angle (the "initial mounting angle") to the centerline 43 of the vehicle 24. For example, if the base plate 102 is mounted at an initial mounting angle of ninety degrees to the vehicle centerline 43, the bracket 20 might bend so that the air bag 70 inflates in a direction about thirty degrees outward of the centerline. As another example, if the base plate 102 is mounted at an initial mounting angle of one hundred and five degrees to the vehicle centerline, the bracket might bend so that the air bag inflates in a direction about forty-five degrees outward of the centerline.

Another factor that determines the angle at which the air bag 70 will deploy, relative to the vehicle centerline 43, is the spatial relationship between (i) the stop edges 156 on the stop arms 150 and (ii) the stop surface 94 on the arcuate section 92 of the seat mounting portion 90 of the bracket 20. This relationship controls the distance and angle through which the module mounting portion 100 of the bracket 20 moves relative to the seat mounting portion 90 of the bracket.

For example, the greater the initial distance between the stop edges 156 and the stop surface 94, the greater the distance and angle through which the module mounting portion 100 of the bracket 20 will move relative to the seat mounting portion 90 of the bracket. Other factors affecting this distance and angle include the angle of the stop edges 156 relative to the base plate 102, the length of the stop arms 150, and the length and position of the stop edges relative to the line of weakening 122. The angle by which the module mounting portion 100 of the bracket 20 moves relative to the seat mounting portion 90 of the bracket can be in the range of from five degrees to forty-five degrees or more.

FIG. 6 illustrates a vehicle safety apparatus 10*a* in accordance with a second embodiment of the invention. The safety apparatus 10*a* is generally similar in construction to the safety apparatus 10 (FIGS. 1–5), and parts that are the same or similar are given similar reference numerals with the suffix "a" added.

The safety apparatus 10*a* includes a bracket 200 for mounting an air bag module 22*a* to a seat frame member 50*a*. The bracket 200 has a generally L-shaped configuration as viewed from above in FIG. 6, including a mounting arm 202 and a directional control arm 204. The mounting arm 202 is secured to the seat frame member 50*a*. The air bag module 22*a* is secured to the mounting arm 202, close to an inboard end portion 206 of the mounting arm.

The directional control arm 204 extends forward and outward from the inner end portion 206 of the mounting arm 202. The directional control arm 204 is located inboard of the air bag module 22*a*. The inner cover 80*a* half extends along, or overlies, the directional control arm 204.

The bracket 200 does not bend upon actuation of the inflator 72*a*. The inner cover half 80*a*, however, can not move significantly inboard relative to the seat 24*a* because of the presence of the directional control arm 204. Therefore, when the cover 74*a* opens to allow inflation of the air bag 70*a*, the air bag is constrained to inflate in a more outboard direction than would be the case were the directional control arm 204 not present.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle having a seat for the occupant and a vehicle side structure, said apparatus comprising:

an air bag module including an air bag inflatable into a position between the occupant and the vehicle side structure; and a bracket for supporting said air bag module on the vehicle seat, said bracket comprising:
a first bracket portion connectable to a seat frame;
a second bracket portion connectable to said module; and
a hinge disposed intermediate said first and second bracket portions and interconnecting said first and second bracket portions to enable said second bracket portion to pivot relative to said first bracket portion during inflation of said air bag to affect a direction in which said air bag deploys from said vehicle seat.

2. An apparatus as set forth in claim 1 wherein said second bracket portion has a stop part that is engageable with said first bracket part to limit pivotal movement of said second bracket part relative to said first bracket part.

3. An apparatus as set forth in claim 2 wherein said first bracket portion comprises a box-shaped mounting structure including a base plate for mounting said module and said stop part comprises a stop arm that projects from said box-shaped mounting structure.

4. An apparatus as set forth in claim 2 wherein said second bracket portion pivots through an angle that is determined by a configuration of said stop part.

5. An apparatus as set forth in claim 4 wherein said stop part projects from said second bracket portion to a position adjacent to but spaced apart from said first bracket portion prior to inflation of said air bag.

6. An apparatus as set forth in claim 1 wherein said first portion of said bracket is formed as one piece with said second portion of said bracket.

7. An apparatus as set forth in claim 1 wherein said hinge is a predetermined weakened portion of said bracket.

8. An apparatus as set forth in claim 7 wherein said first portion of said bracket is formed as one piece with said second portion of said bracket.

9. An apparatus as set forth in claim 8 wherein said bracket comprises stamped and formed sheet metal.

10. An apparatus as set forth in claim 1 wherein said second bracket portion is movable relative to said first bracket portion through an angle in the range of from about five degrees to about forty-five degrees.

11. An apparatus for helping to protect an occupant of a vehicle having a seat for the occupant and a vehicle side structure, said apparatus comprising:
an air bag module including an air bag inflatable into a position between the occupant and the vehicle side structure and an actuatable inflator for inflating said air bag; and
a bracket for supporting said air bag module on the vehicle seat, said bracket comprising a first bracket portion connectable to the seat frame, a second bracket portion connectable to said module, and means for enabling said second bracket portion to pivot relative to said first bracket portion in response to actuation of said inflator to affect the direction in which said air bag deploys from said vehicle seat.

12. An apparatus as set forth in claim 11 wherein said means for enabling comprises a portion of said bracket bendable in a predetermined manner by a reaction force generated by said inflator upon actuation of said inflator.

13. An apparatus as set forth in claim 12 wherein said first portion of said bracket is formed as one piece with said second portion of said bracket.

14. An apparatus as set forth in claim 13 wherein said bracket comprises stamped and formed sheet metal.

15. An apparatus as set forth in claim 11 wherein said second bracket portion is movable relative to said first bracket portion by an angle in the range of from about five degrees to about 45 degrees.

* * * * *